US012683453B2

(12) United States Patent
Ono et al.

(10) Patent No.: US 12,683,453 B2
(45) Date of Patent: Jul. 14, 2026

(54) COOLER, HOUSING, AND ROTATING ELECTRIC MACHINE

(71) Applicant: HONDA MOTOR CO., LTD., Tokyo (JP)

(72) Inventors: Yuji Ono, Wako (JP); Keiji Tada, Wako (JP); Hiroshi Nagami, Wako (JP); Masaki Sato, Wako (JP); Yoshiyuki Hoshi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 197 days.

(21) Appl. No.: 18/784,349

(22) Filed: Jul. 25, 2024

(65) Prior Publication Data

US 2025/0038614 A1     Jan. 30, 2025

(30) Foreign Application Priority Data

Jul. 28, 2023    (JP) ................................. 2023-123416

(51) Int. Cl.
*H02K 5/18*          (2006.01)

(52) U.S. Cl.
CPC ..................................... *H02K 5/18* (2013.01)

(58) Field of Classification Search
CPC ....... H02K 5/18; H02K 2213/03; H02K 5/203
See application file for complete search history.

(56) References Cited

U.S. PATENT DOCUMENTS

| | | | | |
|---|---|---|---|---|
| 2009/0145581 A1* | 6/2009 | Hoffman | .................... | F28F 1/42 |
| | | | | 165/80.3 |
| 2011/0036551 A1* | 2/2011 | Hancock | ................. | F28F 1/325 |
| | | | | 165/181 |
| 2013/0248150 A1* | 9/2013 | Ninagawa | ............... | F28F 1/325 |
| | | | | 165/104.19 |
| 2022/0325632 A1 | 10/2022 | Yazaki et al. | | |

FOREIGN PATENT DOCUMENTS

| | | | |
|---|---|---|---|
| JP | 07-264802 A | 10/1995 |
| JP | 09-093865 A | 4/1997 |
| JP | 2002-044932 A | 2/2002 |
| JP | 2004-312886 A | 11/2004 |
| JP | 2012-039816 A | 2/2012 |
| JP | 2022-157733 A | 10/2022 |

\* cited by examiner

*Primary Examiner* — Tulsidas C Patel
*Assistant Examiner* — Mohammed Ahmed Qureshi
(74) *Attorney, Agent, or Firm* — Rankin, Hill & Clark LLP

(57) ABSTRACT

A cooler includes a base material, and a plurality of ribs protruding from a main surface of the base material, a distance between an upstream side end portion of a first rib and an upstream side end portion of a second rib in a second direction is larger than a distance between a downstream side end portion of the first rib and a downstream side end portion of the second rib in the second direction, and a distance between the upstream side end portion of the second rib and an upstream side end portion of a third rib in the second direction is smaller than a distance between the downstream side end portion of the second rib and a downstream side end portion of the third rib in the second direction.

5 Claims, 14 Drawing Sheets

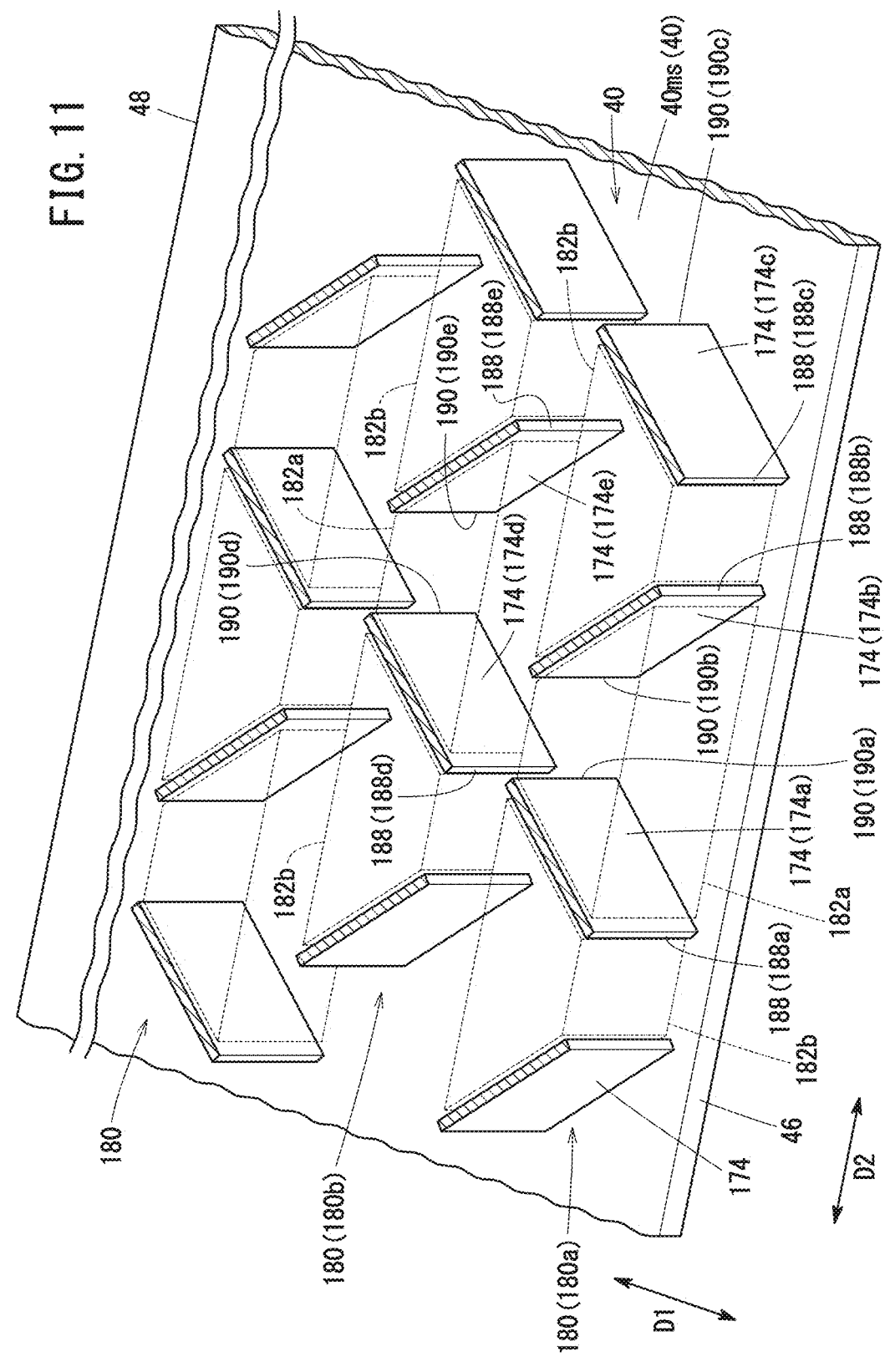
F I G. 11

F I G. 13
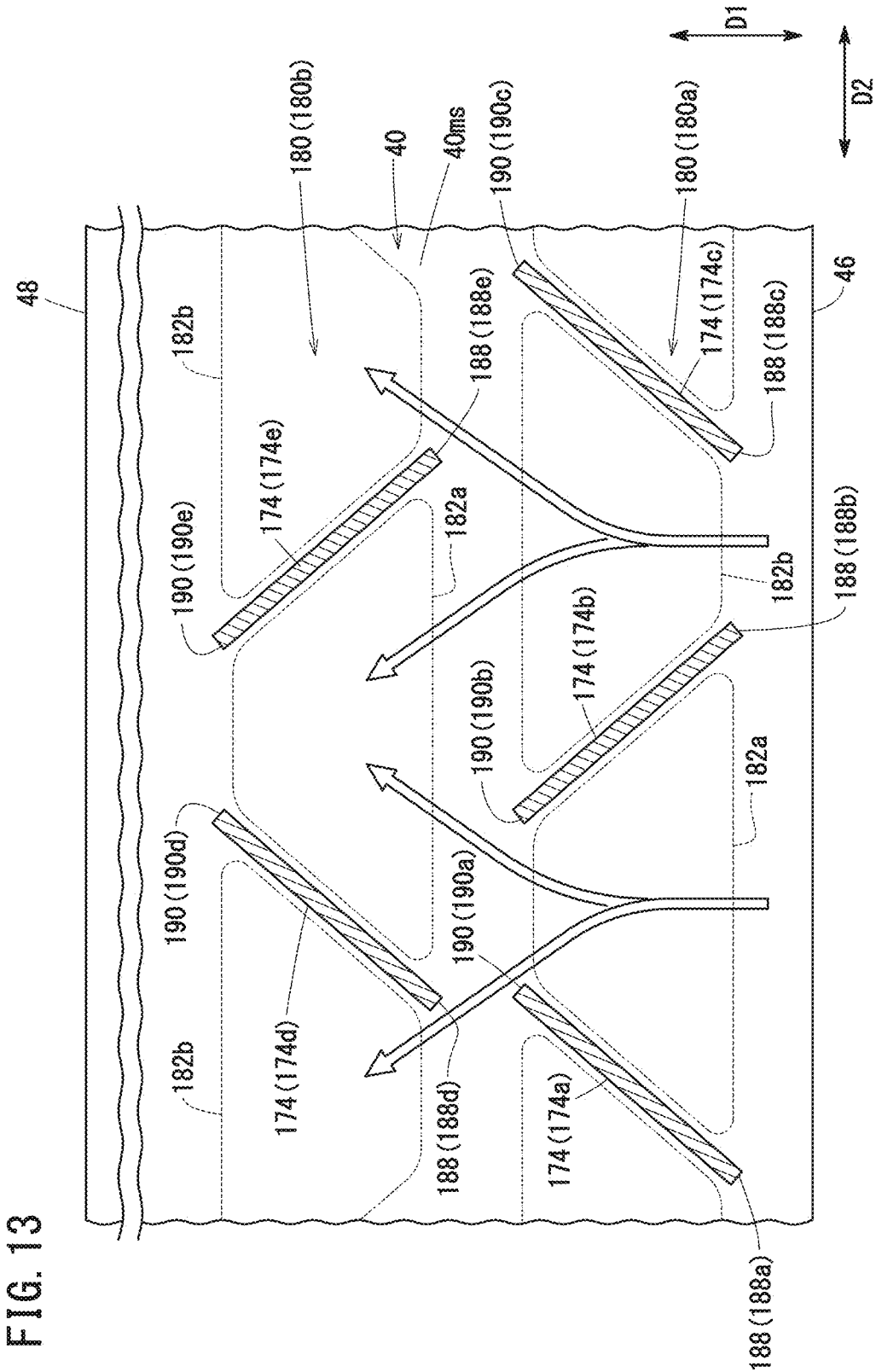

COOLER, HOUSING, AND ROTATING ELECTRIC MACHINE

CROSS-REFERENCE TO RELATED APPLICATIONS

This application is based upon and claims the benefit of priority from Japanese Patent Application No. 2023-123416 filed on Jul. 28, 2023, the contents of which are incorporated herein by reference.

BACKGROUND OF THE INVENTION

Field of the Invention

The present invention relates to a cooler, a housing, and a rotating electric machine.

Description of the Related Art

JP H09-093865 A discloses an induction motor in which a plurality of fins (also referred to as ribs) extending in the axial direction are provided on the outer peripheral surface of a housing. In this induction motor, each fin is cooled by an airflow generated by the fan. The fins are arranged along the direction of the airflow. The plurality of fins constitute a cooler.

SUMMARY OF THE INVENTION

There has been a demand for a cooler, a housing, and a rotating electric machine which are more favorable.

An object of the present invention is to solve the above-mentioned problem.

A cooler of a first aspect of the present invention comprises: a base material; and a plurality of ribs protruding from a main surface of the base material, wherein a first end portion of the base material is located at an inflow end into which a coolant flows, a second end portion of the base material is located at an outflow end from which the coolant flows out, the plurality of ribs include a first rib group including a plurality of the ribs arranged in a second direction that intersects a first direction which is a direction from the first end portion of the base material toward the second end portion of the base material, the first rib group includes a first rib among the plurality of ribs, a second rib among the plurality of ribs, and a third rib among the plurality of ribs, the second rib is located between the first rib and the third rib, a distance between an upstream side end portion of the first rib and an upstream side end portion of the second rib in the second direction is larger than a distance between a downstream side end portion of the first rib and a downstream side end portion of the second rib in the second direction, and a distance between the upstream side end portion of the second rib and an upstream side end portion of the third rib in the second direction is smaller than a distance between the downstream side end portion of the second rib and a downstream side end portion of the third rib in the second direction.

A housing of a second aspect of the present invention comprises the cooler according to the first aspect.

A rotating electric machine of a third aspect of the present invention comprises the housing according to the second aspect.

According to the present invention, it is possible to provide a cooler, a housing, and a rotating electric machine which are more favorable.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 3 is a partial cross-sectional view of an outer tube component and a cooler;

FIG. 7 is a schematic view of the inside of the cooler of the first example;

FIG. 10 is an enlarged view of a pair of ribs (a rib in a first posture and a rib in a second posture);

FIG. 11 is a schematic view of the inside of the cooler of a second example;

FIG. 13 is a diagram showing the flow of the coolant in the second example.

DETAILED DESCRIPTION OF THE INVENTION

1. Rotating Electric Machine 10

Figure 1:
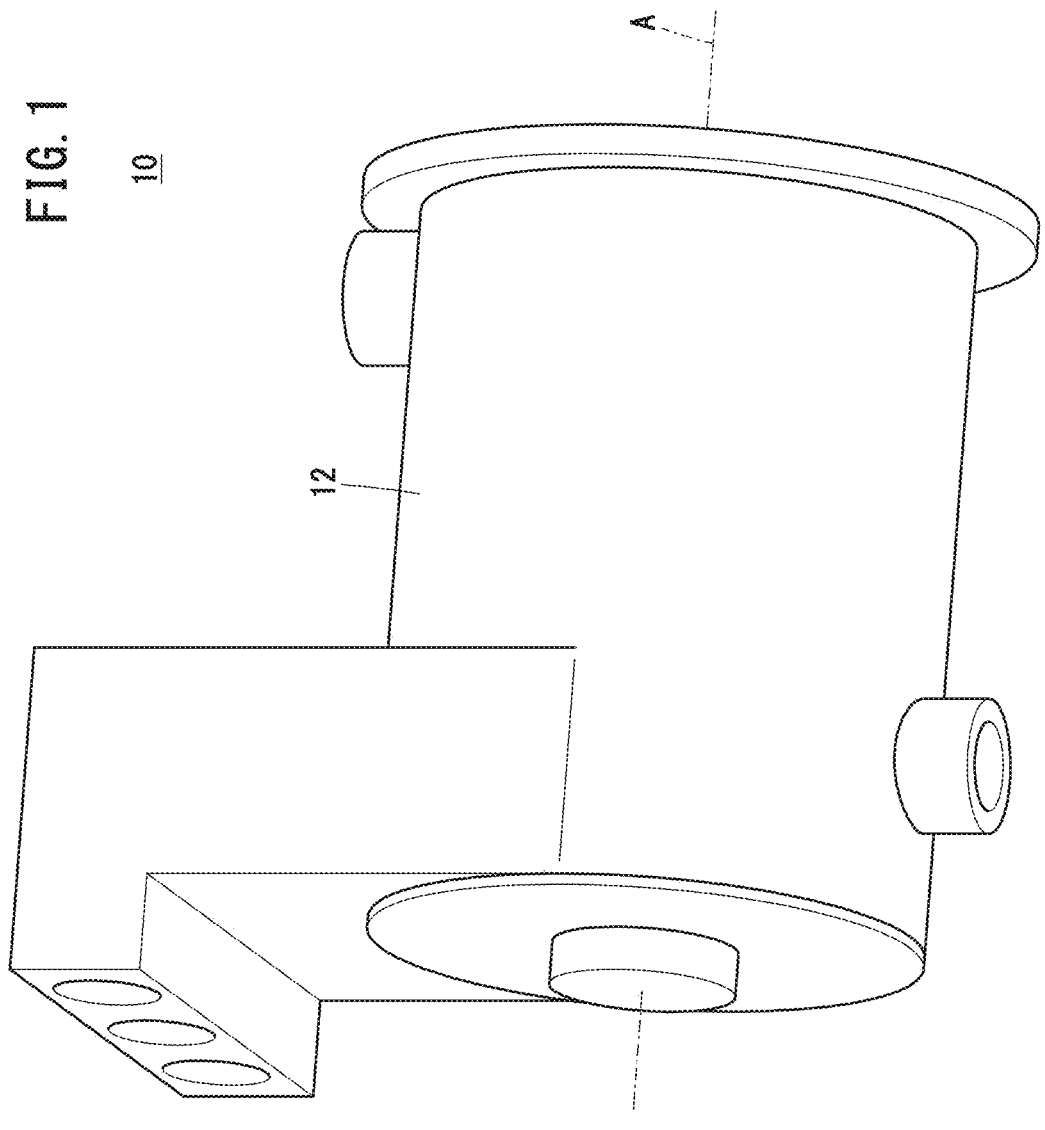
FIG. 1 is a schematic view of a rotating electric machine.

FIG. 1 is a schematic view of a rotating electric machine 10. Examples of the rotating electric machine 10 include an electric motor, a generator, or the like. The rotating electric machine 10 includes a rotor and a stator (electric device), which are not shown, and a housing 12. At least one of the rotor or the stator includes coils and an iron core. The coils and the iron core generate heat in accordance with the operation of the rotating electric machine 10. That is, the rotor and the stator are heating elements. The housing 12 accommodates the rotor and the stator inside the housing 12. The housing 12 has a function of cooling the rotor and the stator.

The housing 12 includes a tubular side wall. A coolant passage 44 (FIG. 2) through which a coolant flows is formed inside the side wall. The coolant passage 44 constitutes a part of a circulation passage (not shown) for circulating the coolant inside and outside the housing 12. For example, a radiator (not shown) is provided in the circulation passage outside the housing 12. In the coolant passage 44, the coolant absorbs heat generated in the rotor and the stator, and in the radiator, the coolant dissipates the heat absorbed in the coolant passage 44.

The rotating electric machine 10 is mounted on various machines. For example, the rotating electric machine 10 mounted on a moving object such as an aircraft is required to have a high output (power or electric power) and a small size (light weight). The temperature of the high-output and small-sized rotating electric machine 10 becomes higher. Therefore, the housing 12 in which the coolant passage 44 is formed needs to have a high cooling capacity. On the other hand, the housing 12 needs to have strength against external force.

It is known that a high cooling capacity can be obtained by arranging a plurality of ribs 74 (FIG. 6 or the like) inside the coolant passage 44. As one method for further improving the cooling capacity, it is considered to make the ribs 74 finer. This can increase the surface area of the inside of the coolant passage 44. Further, since the coolant is stirred when the flow of the coolant becomes complicated, unevenness of the temperature of the coolant can be reduced. Generally, the housing 12 is manufactured by casting, forging, or the like. However, it is difficult for the fine ribs 74 to be formed inside the coolant passage 44 of the housing 12 by casting or forging.

In recent years, it has become possible to manufacture metal components using additive manufacturing in which metal is laminated while repeatedly melting and solidifying a metal powder. In the present specification, a method for manufacturing a metal component using additive manufacturing is referred to as an AM method. According to the AM method, it is possible to manufacture the fine ribs 74. However, the metal component including a fine portion may be relatively inferior in strength to a metal component not including a fine portion. In particular, when an external force acts on the fine ribs 74, the ribs 74 may be damaged.

As will be described later, in the housing 12 according to the present disclosure, a portion in which strength is required and a portion which is required to be fine are formed of separate components. As a result, it is possible for the housing 12 to have both high cooling capacity and high strength.

2. Structure of Housing 12

Figure 2:
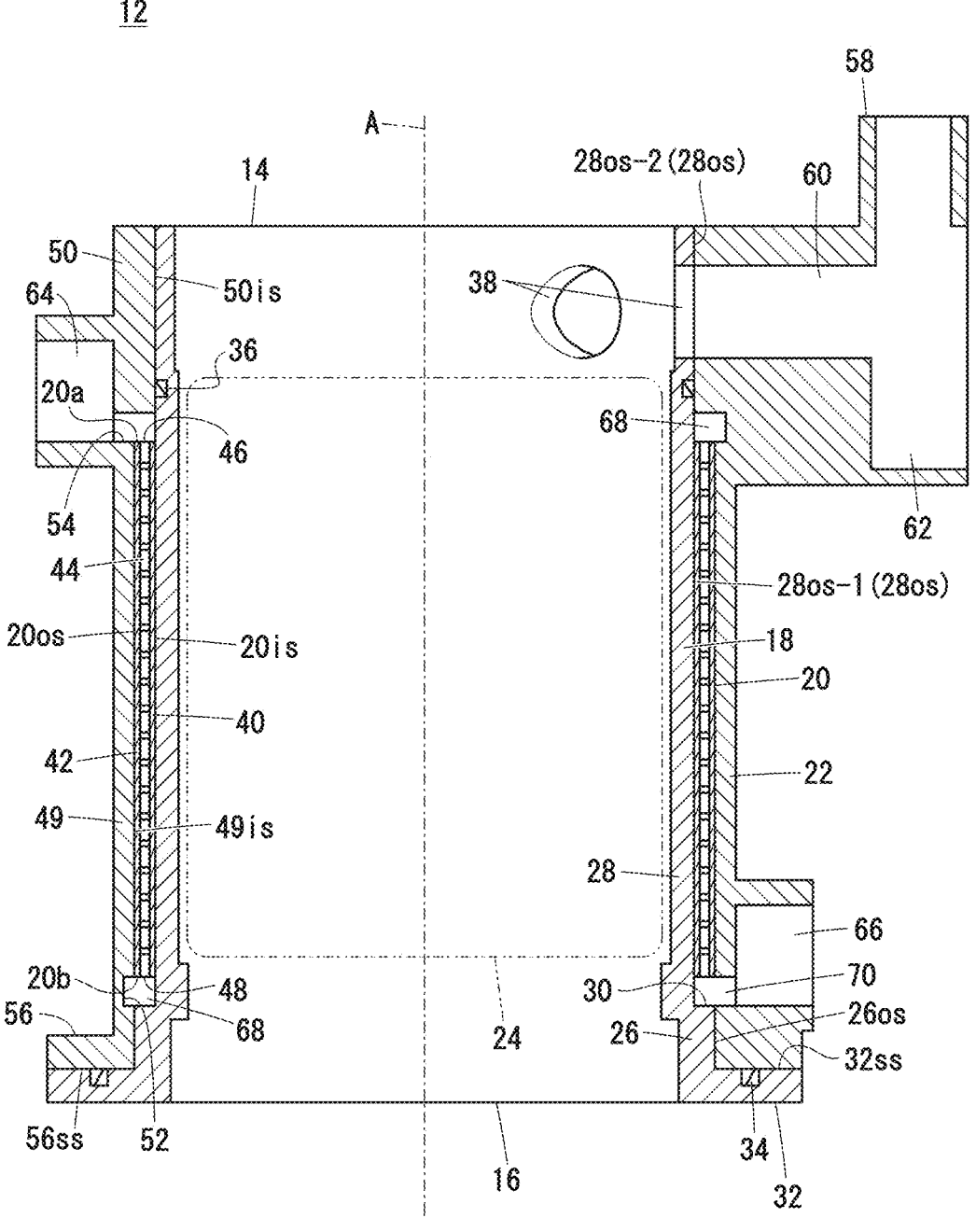
FIG. 2 is a cross-sectional view of a housing.

FIG. 2 is a cross-sectional view of the housing 12. In the present specification, one end of the housing 12 in the axial direction is referred to as a first housing end portion 14, and the other end of the housing 12 in the axial direction is referred to as a second housing end portion 16. An opening is formed in each of the first housing end portion 14 and the second housing end portion 16. Each of the openings is closed by another member (not shown).

As shown in FIG. 2, the housing 12 includes an inner tube component 18, a cooler 20, and an outer tube component 22. Each of the inner tube component 18, the cooler 20, and the outer tube component 22 has a tubular shape (for example, a cylindrical shape). Axes A of the inner tube component 18, the cooler 20, and the outer tube component 22 coincide with each other. That is, the inner tube component 18, the cooler 20, and the outer tube component 22 are concentric. A part of the side wall of the housing 12 has a three layer structure in which the side walls of the inner tube component 18, the cooler 20, and the outer tube component 22 are stacked in the radial direction.

2-1. Inner Tube Component 18

The inner tube component 18 is disposed closest to the axis A among the three tubular components forming the housing 12. The inner tube component 18 is a metal product formed by, for example, forging. The inner tube component 18 can accommodate the rotor and the stator in a space (an accommodation portion 24) inside the tube.

The inner tube component 18 includes a large-diameter tube portion 26 and a small-diameter tube portion 28. The large-diameter tube portion 26 is located relatively closer to the second housing end portion 16. The small-diameter tube portion 28 is located relatively closer to the first housing end portion 14. The outer diameter of an outer peripheral surface 26os of the large-diameter tube portion 26 is relatively large. The outer diameter of an outer peripheral surface 28os of the small-diameter tube portion 28 is relatively small. An annular stepped surface 30 is present between the outer peripheral surface 26os of the large-diameter tube portion 26 and the outer peripheral surface 28os of the small-diameter tube portion 28. The stepped surface 30 extends in the radial direction of the small-diameter tube portion 28 from the outer peripheral surface 28os of the small-diameter tube portion 28 to the outer peripheral surface 26os of the large-diameter tube portion 26.

An inner tube flange 32 is formed on the large-diameter tube portion 26. The inner tube flange 32 extends from the large-diameter tube portion 26 in the radial direction of the large-diameter tube portion 26. The inner tube flange 32 includes an inner tube sealing surface 32ss. An O-ring 34 is mounted on the inner tube sealing surface 32ss with the axis A as the center.

The outer peripheral surface 28os of the small-diameter tube portion 28 includes a partial outer peripheral surface 28os-1 and a partial outer peripheral surface 28os-2. The partial outer peripheral surface 28os-1 is disposed closer to the second housing end portion 16. The partial outer peripheral surface 28os-2 is disposed closer to the first housing end portion 14. An O-ring 36 is mounted on the partial outer peripheral surface 28os-2 with the axis A as the center.

A plurality of harness insertion holes 38 are formed in the small-diameter tube portion 28. The harness insertion holes 38 are disposed closer to the first housing end portion 14. The harness insertion holes 38 penetrate the small-diameter tube portion 28 in the radial direction. The plurality of harness insertion holes 38 are formed at the position of the partial outer peripheral surface 28os-2, and arranged along the circumferential direction of the small-diameter tube portion 28. Harnesses (not shown) are inserted into the harness insertion holes 38. The harnesses connect coils wound around the rotor or the stator accommodated in the accommodation portion 24 of the inner tube component 18 and terminals of the rotating electric machine 10 accommodated in a casing 58 of the outer tube component 22.

2-2. Cooler 20

The cooler 20 is disposed outside the inner tube component 18. The cooler 20 surrounds the partial outer peripheral surface 28os-1 of the inner tube component 18. The cooler 20 is a metal product formed by, for example, the AM method.

The cooler 20 includes an inner peripheral tube portion 40 having a tubular shape, and an outer peripheral tube portion 42 having a tubular shape. The inner peripheral tube portion 40 is disposed closer to the axis A than the outer peripheral tube portion 42 is. The inner peripheral tube portion 40 forms an inner peripheral surface 20is of the cooler 20. The outer peripheral tube portion 42 surrounds the inner peripheral tube portion 40. The outer peripheral tube portion 42 forms an outer peripheral surface 20os of the cooler 20. The cooler 20 has a double tube structure of the inner peripheral tube portion 40 and the outer peripheral tube portion 42. The outer diameter of the cooler 20 is slightly smaller than the outer diameter of the large-diameter tube portion 26 of the inner tube component 18.

The coolant passage 44 for causing the coolant to flow along the partial outer peripheral surface 28os-1 of the inner tube component 18 is defined by the inner peripheral tube portion 40 and the outer peripheral tube portion 42. The coolant passage 44 has a cylindrical shape centered on the axis A. An inflow end 46, which is one end of the coolant passage 44, is disposed closer to the first housing end portion 14. An outflow end 48, which is the other end of the coolant passage 44, is disposed closer to the second housing end portion 16. A first end portion 20a of the cooler 20 is located at the inflow end 46. An inlet for the coolant in the coolant passage 44 is formed in the first end portion 20a of the cooler 20. A second end portion 20b of the cooler 20 is located at the outflow end 48. An outlet for the coolant in the coolant passage 44 is formed in the second end portion 20b of the cooler 20. Each of the inlet and the outlet for the coolant is an annular opening centered on the axis A.

As will be described later, the plurality of ribs 74 (FIG. 6 or the like) are disposed in the coolant passage 44 between the inner peripheral tube portion 40 and the outer peripheral tube portion 42. The inner peripheral tube portion 40, the outer peripheral tube portion 42, and the plurality of ribs 74 are integrally formed by the AM method. The internal structure of the cooler 20 will be described in detail later.

The inner peripheral surface 20is of the cooler 20 is fitted to the partial outer peripheral surface 28os-1 of the inner tube component 18. As will be described later, before the cooler 20 and the inner tube component 18 are fitted to each other, thermal grease 72 (FIG. 4) is applied to the partial outer peripheral surface 28os-1 of the inner tube component 18. Therefore, the thermal grease 72 is filled in a minute gap between the partial outer peripheral surface 28os-1 of the inner tube component 18 and the inner peripheral surface 20is of the cooler 20. By bringing the inner tube component 18 and the cooler 20 into close contact with each other without an air layer being interposed therebetween, the thermal resistance between the inner tube component 18 and the cooler 20 can be reduced. Therefore, the heat conduction performance from the inner tube component 18 to the cooler 20 can be improved.

The distance from the inner peripheral surface 20is of the cooler 20 to the outer peripheral surface 20os of the cooler 20 is slightly smaller than the radial length of the stepped surface 30 of the inner tube component 18. Consequently, the outer peripheral surface 20os of the cooler 20 and an inner peripheral surface 50is of the outer tube component 22 are separated from each other. A gap G (FIG. 3) is formed between the outer peripheral surface 20os of the cooler 20 and an inner peripheral surface 49is of a large-diameter tube portion 49 of the outer tube component 22. Further, the second end portion 20b of the cooler 20 is separated from the stepped surface 30 of the inner tube component 18. As a result, a coolant discharge passage 70, which is a passage through which the coolant is discharged, can be formed inside the outer tube component 22.

2-3. Outer Tube Component 22

The outer tube component 22 is disposed outside the small-diameter tube portion 28 of the inner tube component 18, outside the cooler 20, and outside the large-diameter tube portion 26 of the inner tube component 18. The outer tube component 22 surrounds the partial outer peripheral surface 28os-2 of the small-diameter tube portion 28, the outer peripheral surface 20os of the cooler 20, and the outer peripheral surface 26os of the large-diameter tube portion 26. The outer tube component 22 is a metal product formed by, for example, casting.

The outer tube component 22 includes the large-diameter tube portion 49 and a small-diameter tube portion 50. The large-diameter tube portion 49 is disposed relatively closer to the second housing end portion 16. The small-diameter tube portion 50 is disposed relatively closer to the first housing end portion 14. The inner diameter of the inner peripheral surface 49is of the large-diameter tube portion 49 is relatively large. The inner diameter of the inner peripheral surface 50is of the small-diameter tube portion 50 is relatively small. The inner diameter of the inner peripheral surface 49is of the large-diameter tube portion 49 is slightly larger than the outer diameter of the cooler 20 and is equal to the outer diameter of the large-diameter tube portion 26 of the inner tube component 18.

An annular groove 52 centered on the axis A is formed in the inner peripheral surface 49is of the large-diameter tube portion 49. An annular groove 54 centered on the axis A is formed at a boundary between the inner peripheral surface 49is of the large-diameter tube portion 49 and the inner peripheral surface 50is of the small-diameter tube portion 50.

An outer tube flange 56 is formed on the outer tube component 22. The outer tube flange 56 is disposed closer to the second housing end portion 16. The outer tube flange 56 extends from the outer tube component 22 in the radial direction of the outer tube component 22. The outer tube flange 56 includes an outer tube sealing surface 56ss. The outer tube sealing surface 56ss faces the inner tube sealing surface 32ss described above.

The casing 58 is formed in the outer tube component 22. The casing 58 is disposed closer to the first housing end portion 14. The casing 58 protrudes from the outer tube component 22 to the outside of the outer tube component 22. A harness insertion passage 60 and a terminal accommodating portion 62 are formed in the casing 58. The harness insertion passage 60 allows communication between the harness insertion holes 38 formed in the inner tube component 18 and the terminal accommodating portion 62. The harnesses are inserted into the harness insertion passage 60. The terminal accommodating portion 62 accommodates the terminals of the rotating electric machine 10.

The outer tube component 22 includes a coolant inlet 64 and a coolant outlet 66. The coolant inlet 64 is disposed relatively closer to the first housing end portion 14. The coolant inlet 64 is connected to one end of the circulation passage for the coolant described above. The coolant inlet 64 communicates with the groove 54. The coolant outlet 66 is disposed relatively closer to the second housing end portion 16. The coolant outlet 66 is connected to the other end of the circulation passage for the coolant described above. The coolant outlet 66 communicates with the groove 52.

Figure 3:
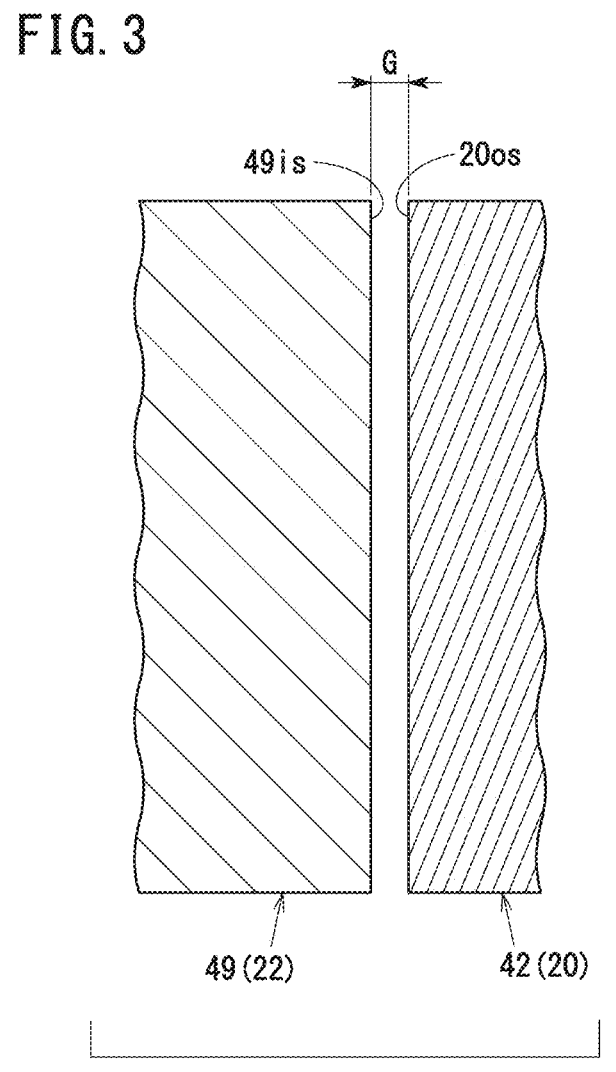

The inner peripheral surface 50is of the small-diameter tube portion 50 of the outer tube component 22 is fitted to the partial outer peripheral surface 28os-2 of the inner tube component 18. Within the inner peripheral surface 49is of the large-diameter tube portion 49 of the outer tube component 22, a portion between the groove 52 and the groove 54 faces the outer peripheral surface 20os of the cooler 20. The inner peripheral surface 49is of the large-diameter tube portion 49 of the outer tube component 22 and the outer peripheral surface 20os of the cooler 20 are separated from each other. Specifically, as shown in FIG. 3, the gap G is formed over the entire circumference between the inner peripheral surface 49*is* of the large-diameter tube portion 49 of the outer tube component 22 and the outer peripheral surface 20*os* of the cooler 20. The dimension of the gap G in the radial direction of the housing 12 is set as appropriate.

On the other hand, as shown in FIG. 2, within the inner peripheral surface 49*is* of the large-diameter tube portion 49 of the outer tube component 22, a portion closer to the second housing end portion 16 than the groove 52 is in close contact with the outer peripheral surface 26*os* of the large-diameter tube portion 26 of the inner tube component 18. The outer tube flange 56 provided with the outer tube sealing surface 56*ss* and the inner tube flange 32 provided with the inner tube sealing surface 32*ss* are fastened by fastening members such as bolts as described later.

2-4. Passages for Coolant Inside Housing 12

A coolant supply passage 68 is formed along the circumferential direction of the housing 12 by the wall surface of the groove 54 of the outer tube component 22 and the partial outer peripheral surface 28*os*-2 of the inner tube component 18. The shape of the coolant supply passage 68 is an annular shape centered on the axis A. The coolant supply passage 68 is located at the inflow end 46 of the coolant passage 44. That is, the coolant supply passage 68 is disposed at the first end portion 20*a* of the cooler 20. The coolant supply passage 68 communicates with the coolant inlet 64. Consequently, the coolant passage 44 of the cooler 20 communicates with the coolant inlet 64 via the coolant supply passage 68.

The coolant discharge passage 70 is formed along the circumferential direction of the housing 12 by the wall surface of the groove 52 of the outer tube component 22, the partial outer peripheral surface 28*os*-1 of the inner tube component 18, and the stepped surface 30 of the inner tube component 18. The shape of the coolant discharge passage 70 is an annular shape centered on the axis A. The coolant discharge passage 70 is located at the outflow end 48 of the coolant passage 44. That is, the coolant discharge passage 70 is disposed at the second end portion 20*b* of the cooler 20. The coolant discharge passage 70 communicates with the coolant outlet 66. Consequently, the coolant passage 44 of the cooler 20 communicates with the coolant outlet 66 via the coolant discharge passage 70.

The passages for the coolant (the coolant supply passage 68, the coolant passage 44 of the cooler 20, and the coolant discharge passage 70) formed inside the housing 12 are sealed by the O-ring 34 and the O-ring 36.

3. Method for Manufacturing Housing 12

Figure 4:
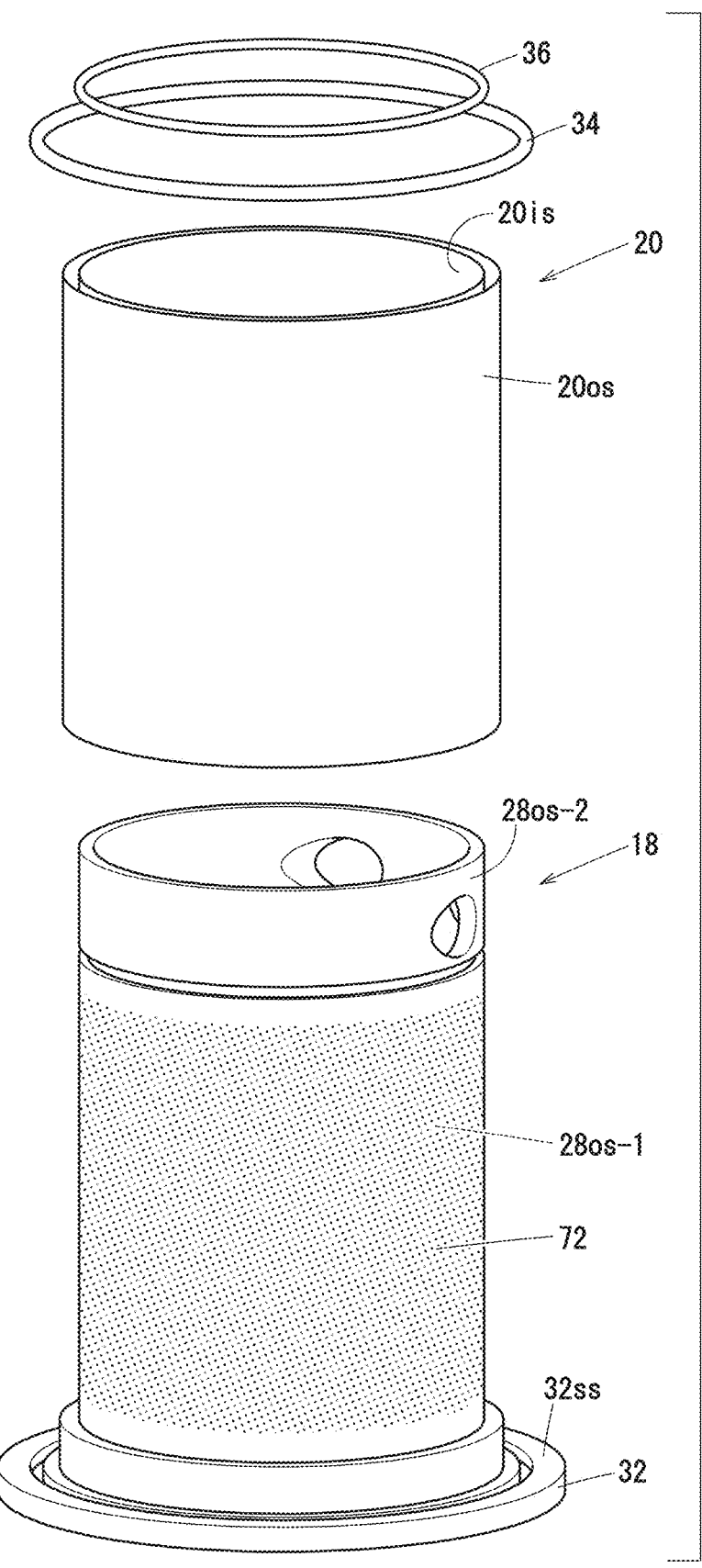
FIG. 4 is a perspective view of an inner tube component and the cooler.
Figure 5:
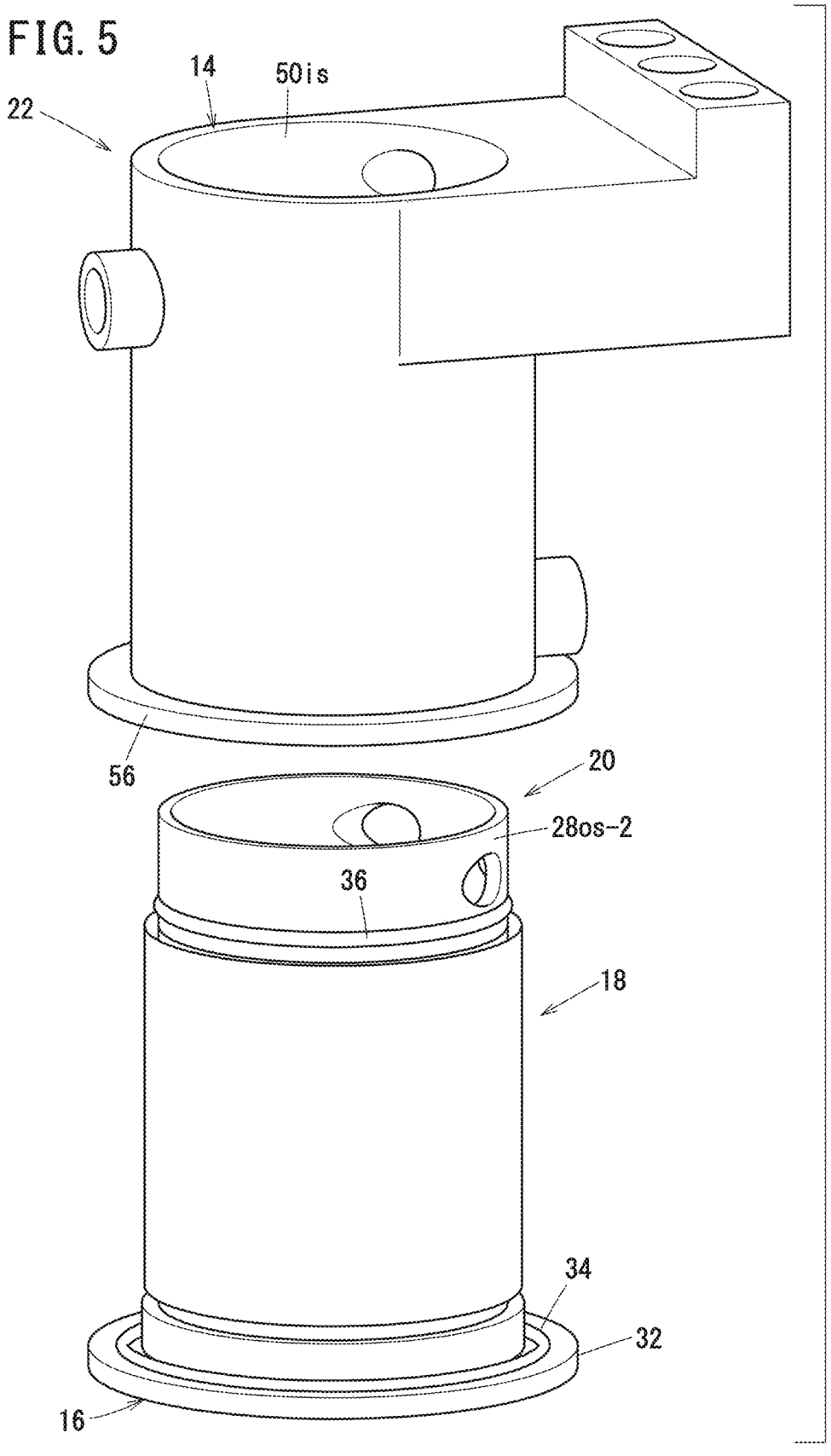
FIG. 5 is a perspective view of the inner tube component, the cooler, and the outer tube component.

FIG. 4 is a perspective view of the inner tube component 18 and the cooler 20. FIG. 5 is a perspective view of the inner tube component 18, the cooler 20, and the outer tube component 22. The housing 12 is manufactured generally through the following processes. First, each component is formed. Specifically, the inner tube component 18 is formed by forging. The cooler 20 is formed by the AM method. The outer tube component 22 is formed by casting.

As shown in FIG. 4, the thermal grease 72 is applied to the partial outer peripheral surface 28*os*-1 of the inner tube component 18. The inner peripheral surface 20*is* of the cooler 20 is shrink-fitted to the partial outer peripheral surface 28*os*-1 of the inner tube component 18 to which the thermal grease 72 is applied. The O-ring 34 is mounted on the inner tube sealing surface 32*ss* of the inner tube component 18. The O-ring 36 is mounted on the partial outer peripheral surface 28*os*-2 of the inner tube component 18.

As shown in FIG. 5, the inner tube component 18 and the cooler 20 that have been integrated are inserted into the outer tube component 22. The inner peripheral surface 50*is* of the small-diameter tube portion 50 of the outer tube component 22 is shrink-fitted to the partial outer peripheral surface 28*os*-2 of the inner tube component 18. The outer tube flange 56 is superposed on the inner tube flange 32.

A lid member (not shown) closes an opening formed in the first housing end portion 14 of the housing 12. The outer tube flange 56 and the inner tube flange 32 are superposed on each other. Further, the outer tube flange 56 and the inner tube flange 32 are fastened to an attachment object (not shown) by fastening members such as bolts. As a result, an opening formed in the second housing end portion 16 of the housing 12 is closed.

4. Flow of Coolant in Housing 12

The flow of the coolant in the housing 12 will be described with reference to FIG. 2. The coolant flows into the housing 12 from the coolant inlet 64. The coolant flows from the coolant inlet 64 to the coolant supply passage 68. The coolant flows into the coolant passage 44 of the cooler 20 from the inflow end 46 of the coolant passage 44 disposed in the coolant supply passage 68. The coolant flows through the coolant passage 44 from the inflow end 46 toward the outflow end 48. The coolant flows out to the coolant discharge passage 70 from the outflow end 48 disposed in the coolant discharge passage 70. The coolant flows through the coolant discharge passage 70 and flows out of the housing 12 from the coolant outlet 66.

5. Advantageous Effects Obtained by Housing 12 of Present Disclosure

In the housing 12 described above, the cooler 20 that defines the coolant passage 44 of the housing 12, the outer tube component 22 that constitutes the outer peripheral portion of the housing 12, and the inner tube component 18 that constitutes the inner peripheral portion of the housing 12 are constituted by separate components. Therefore, the cooler 20, the outer tube component 22, and the inner tube component 18 can be manufactured separately. For example, the outer tube component 22 and the inner tube component 18 can be manufactured by casting or forging which gives strength, and the cooling components (the ribs 74) can be manufactured by the AM method which can form a fine and complicated shape. Therefore, it is possible to provide the housing 12 having high strength and high cooling performance. That is, according to the above disclosure, it is possible to provide the suitable housing 12.

In the housing 12 described above, the cooler 20 is disposed between the outer tube component 22 and the inner tube component 18. As a result, the cooler 20 is protected by the outer tube component 22 and the inner tube component 18.

In the housing 12 described above, the gap G is formed between the inner peripheral surface 49*is* of the large-diameter tube portion 49 of the outer tube component 22 and the outer peripheral surface 20*os* of the cooler 20. That is, the cooler 20 does not contact the outer tube component 22. Therefore, the external force acting on the outer tube component 22 is less likely to be transmitted to the cooler 20 accommodated in the outer tube component 22. Therefore, the cooler 20 is less likely to be damaged.

6. Internal Structure of Cooler 20

The internal structure of the cooler 20 provided in the housing 12 will be described below. As described above, the cooler 20 includes the inner peripheral tube portion 40 (base material) and the outer peripheral tube portion 42. The coolant passage 44 is disposed between the inner peripheral tube portion 40 and the outer peripheral tube portion 42. As will be described later, the plurality of ribs 74 are disposed in the coolant passage 44. As will be described later, the plurality of ribs 74 generate turbulence in the coolant in the coolant passage 44, thereby improving the cooling performance of the cooler 20. Further, as will be described later, the plurality of ribs 74 increase the surface area of the cooler 20 that can be in contact with the coolant, thereby improving the cooling performance of the cooler 20. There are several possible modes of the arrangement and the posture of the ribs 74 in the coolant passage 44. Several modes of the cooler 20 in which the arrangements and the postures of the ribs 74 are different will be exemplified below.

6-1. Cooler 20 of First Example

Figure 6:
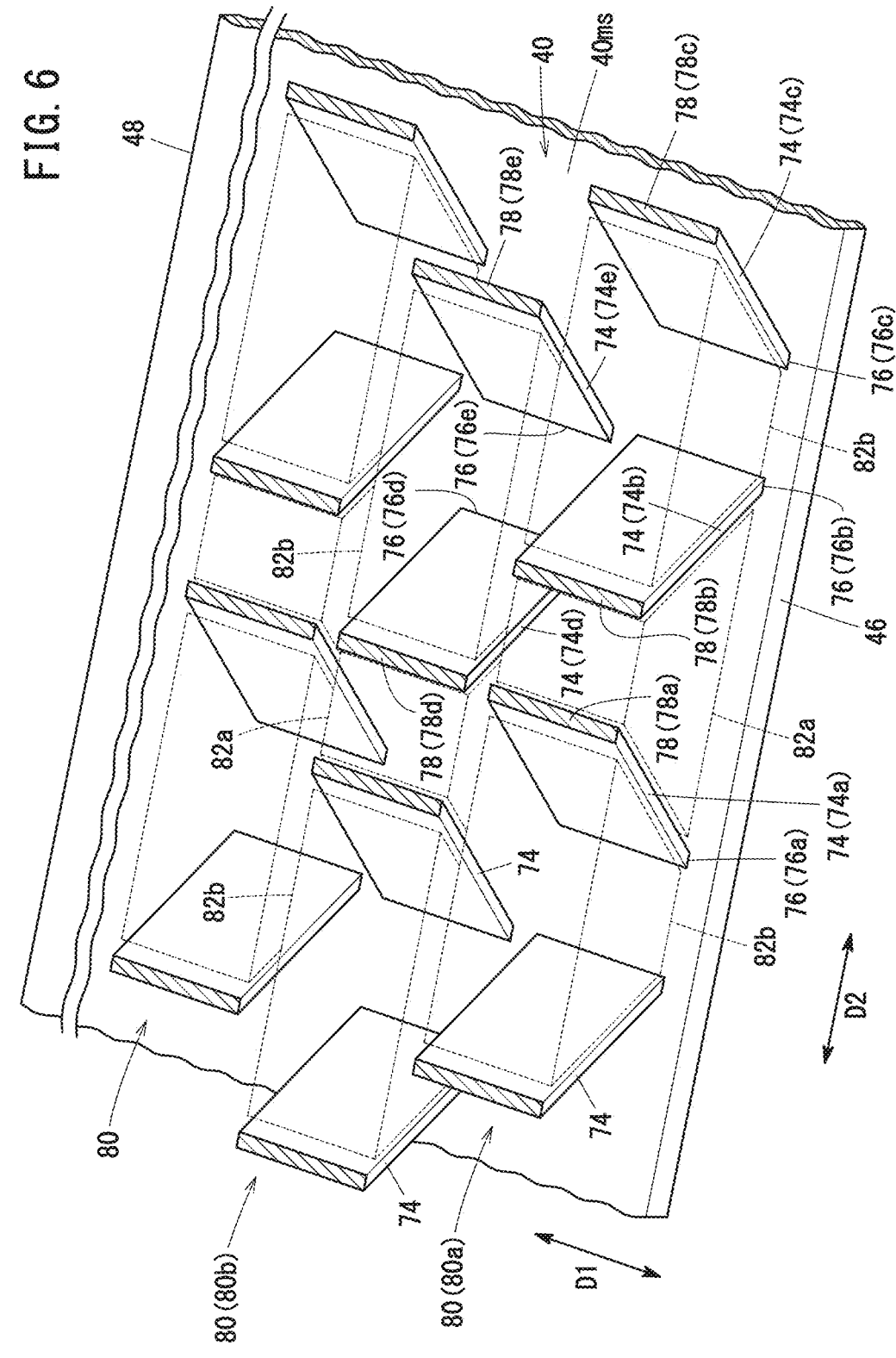
FIG. 6 is a schematic view of the inside of the cooler of a first example.
Figure 7:
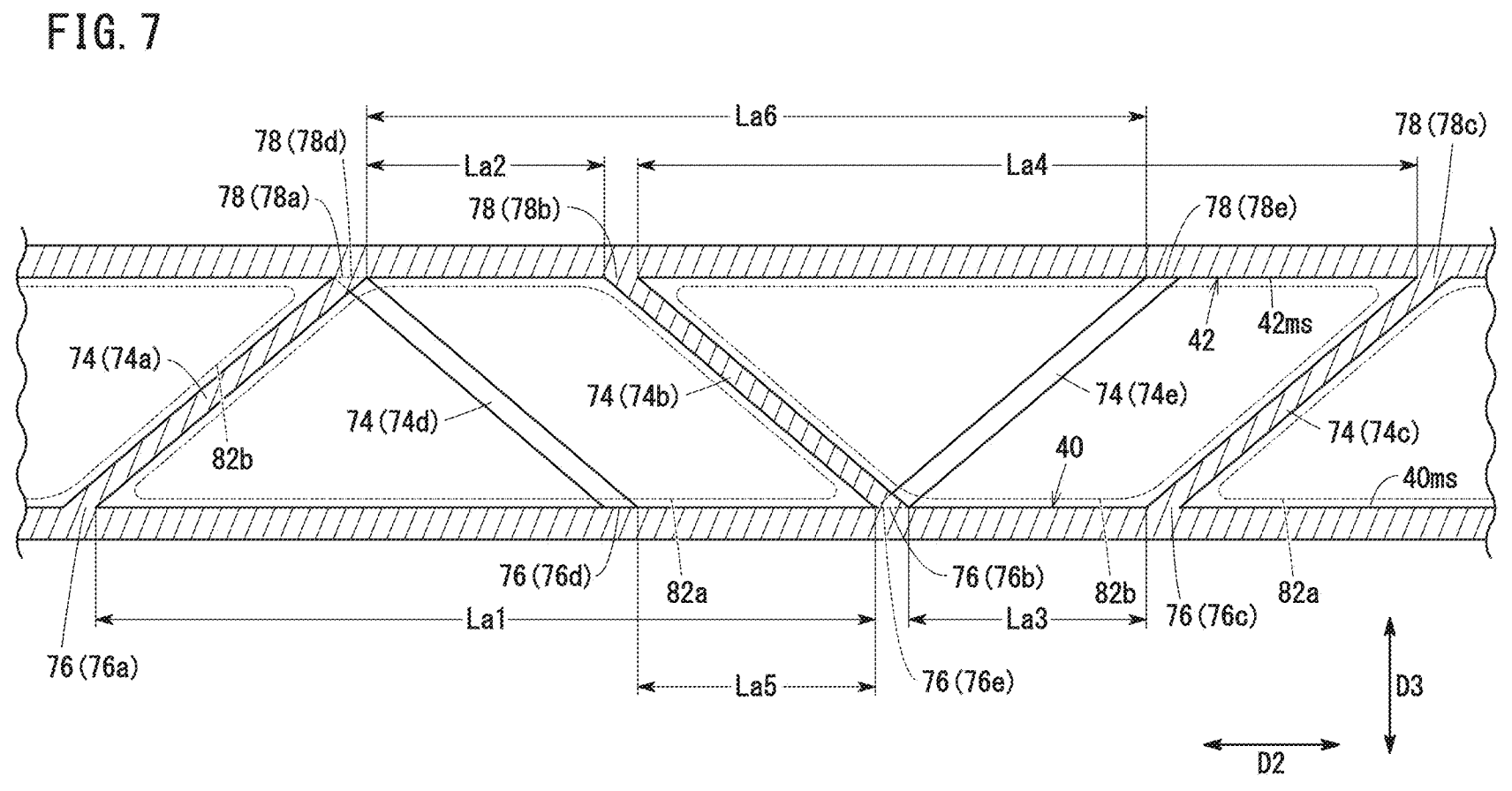
Figure 8:
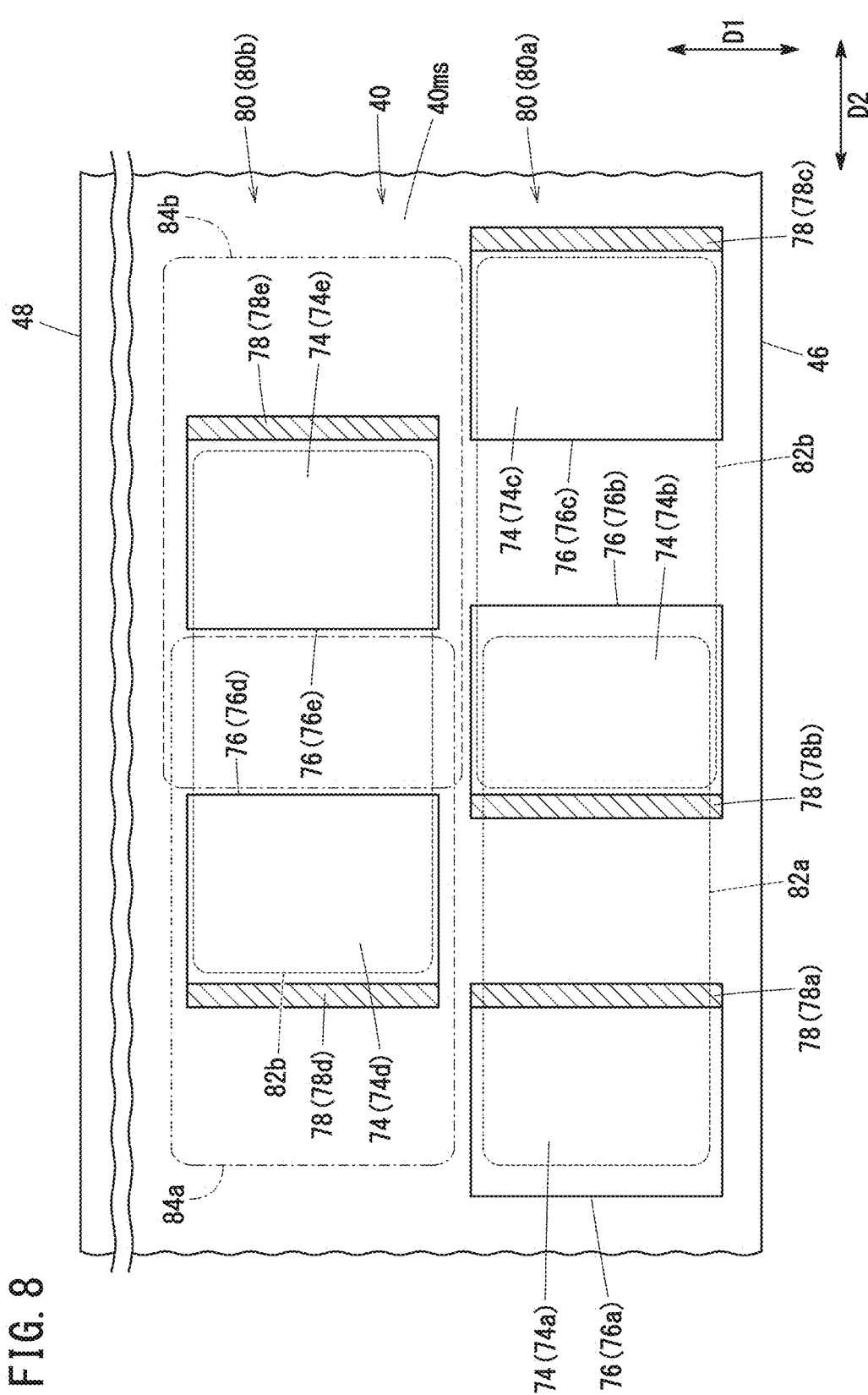
FIG. 8 is a schematic view of the inside of the cooler of the first example.

FIGS. 6 to 8 are schematic views of the inside of the cooler 20 of a first example. Hereinafter, the axial direction of the cooler 20 is defined as a first direction (D1). Further, the circumferential direction of the cooler 20 is defined as a second direction (D2). The second direction (D2) intersects the first direction (D1). Further, the radial direction of the cooler 20 is defined as a third direction (D3). It should be noted that the outer peripheral tube portion 42 is not shown in FIGS. 6 and 8. Although the inner peripheral tube portion 40 and the outer peripheral tube portion 42 are shown as flat in FIGS. 6 to 8, the inner peripheral tube portion 40 and the outer peripheral tube portion 42 are actually curved along the circumferential direction of the cooler 20.

As shown in FIG. 6, the ribs 74 protrude from a main surface 40ms of the inner peripheral tube portion 40 toward the outer peripheral tube portion 42, and are connected to a main surface 42ms (see FIG. 7) of the outer peripheral tube portion 42 (see FIG. 7). In other words, the ribs 74 protrude from the main surface 42ms of the outer peripheral tube portion 42 toward the inner peripheral tube portion 40, and are connected to the main surface 40ms of the inner peripheral tube portion 40. Concerning the shape of the ribs 74, various shapes are conceivable. In the first example, the ribs 74 having a rectangular flat plate shape are illustrated. The ribs 74 are also referred to as fins.

In each of the ribs 74, a portion connected to the main surface 40ms of the inner peripheral tube portion 40 is referred to as a base end 76. In each of the ribs 74, a portion connected to the main surface 42ms of the outer peripheral tube portion 42 is referred to as a protruding end 78.

The plurality of ribs 74 are formed over the entire circumference of the cooler 20. The plurality of ribs 74 are divided into a plurality of rib groups 80. One rib group 80 includes a large number of ribs 74 arranged in the second direction (D2). The plurality of rib groups 80 are adjacent to each other in the first direction (D1). A gap is formed between two rib groups 80 adjacent to each other.
(Rib Group 80a)

In one rib group 80, the ribs 74 in a first posture and the ribs 74 in a second posture are alternately arranged in the second direction (D2). In this instance, for the sake of simplicity, the description will be made focusing on the three ribs 74 included in a rib group 80a. The three ribs 74 illustrated in the example are referred to as a rib 74a, a rib 74b, and a rib 74c. The rib 74b is located between the rib 74a and the rib 74c. Further, the rib 74b is adjacent to the rib 74a and adjacent to the rib 74c. The ribs 74a and 74c are the ribs 74 in the first posture. The rib 74b is the rib 74 in the second posture.

As shown in FIG. 7, a partial passage 82a, which is a part of the coolant passage 44, is defined by the rib 74a, the rib 74b, the inner peripheral tube portion 40, and the outer peripheral tube portion 42. A distance La1 between a base end 76a of the rib 74a and a base end 76b of the rib 74b in the second direction (D2) is larger than a distance La2 between a protruding end 78a of the rib 74a and a protruding end 78b of the rib 74b in the second direction (D2). In the present specification, the distance between the rib 74a and the rib 74b in the second direction (D2) is defined as a width of the partial passage 82a. The width of the partial passage 82a decreases as it is away from the inner peripheral tube portion 40. Therefore, in the partial passage 82a, a difference is generated between the flow velocity of the coolant flowing near the inner peripheral tube portion 40 and the flow velocity of the coolant flowing near the outer peripheral tube portion 42.

As shown in FIG. 7, a partial passage 82b, which is a part of the coolant passage 44, is defined by the rib 74b, the rib 74c, the inner peripheral tube portion 40, and the outer peripheral tube portion 42. A distance La3 between the base end 76b of the rib 74b and a base end 76c of the rib 74c in the second direction (D2) is smaller than a distance La4 between the protruding end 78b of the rib 74b and a protruding end 78c of the rib 74c in the second direction (D2). In the present specification, the distance between the rib 74b and the rib 74c in the second direction (D2) is defined as a width of the partial passage 82b. The width of the partial passage 82b increases as it is away from the inner peripheral tube portion 40. Therefore, in the partial passage 82b, a difference is generated between the flow velocity of the coolant flowing near the inner peripheral tube portion 40 and the flow velocity of the coolant flowing near the outer peripheral tube portion 42.

As shown in FIG. 6, at the position of each rib group 80, the partial passage 82a narrower near the outer peripheral tube portion 42 than near the inner peripheral tube portion 40, and the partial passage 82b wider near the outer peripheral tube portion 42 than near the inner peripheral tube portion 40, are alternately arranged in the second direction (D2). The rib 74 is interposed between the partial passage 82a and the partial passage 82b adjacent to each other.
(Rib Group 80b)

As shown in FIG. 6, the plurality of ribs 74 included in the rib groups 80 other than the rib group 80a are also arranged in the same manner as the plurality of ribs 74 included in the rib group 80a. For example, the plurality of ribs 74 included in a rib group 80b adjacent to the rib group 80a are also arranged in the same manner as the plurality of ribs 74 included in the rib group 80a. It should be noted that the partial passages 82a and 82b at the position of the rib group 80b are eccentric with respect to the partial passages 82a and 82b at the position of the rib group 80a. Here, the arrangement and the posture of the plurality of ribs 74 included in the two rib groups 80 will be described by taking three ribs 74 included in the rib group 80a and two ribs 74 included in the rib group 80b as an example. The two ribs 74 included in the rib group 80b are referred to as a rib 74d and a rib 74e. The rib 74d is adjacent to the rib 74e. The rib 74d is the rib 74 in the second posture. The rib 74e is the rib 74 in the first posture.

As shown in FIG. 8, a space obtained by virtually extending the partial passage 82a toward the downstream of the coolant is referred to as a first extension space 84a. A space obtained by virtually extending the partial passage 82*b* toward the downstream of the coolant is referred to as a second extension space 84*b*. At least a portion of the rib 74*d* is located in the first extension space 84*a*. At least a portion of the rib 74*e* is located in the second extension space 84*b*.

As shown in FIG. 7, a distance La5 between a base end 76*d* of the rib 74*d* and a base end 76*e* of the rib 74*e* in the second direction (D2) is different from a distance La6 between a protruding end 78*d* of the rib 74*d* and a protruding end 78*e* of the rib 74*e* in the second direction (D2).

In FIGS. 6 to 8, the entire rib 74*d* is located in the first extension space 84*a*. In FIGS. 6 to 8, the posture of the rib 74*d* is the same as the posture of the rib 74*b*. In FIGS. 6 to 8, the entire rib 74*e* is located in the second extension space 84*b*. In FIGS. 6 to 8, the posture of the rib 74*e* is the same as the postures of the ribs 74*a* and 74*c*. In FIGS. 6 to 8, the distance La5 is smaller than the distance La6.

It should be noted that a first portion of the rib 74*d* may be located in the first extension space 84*a*, and a second portion of the rib 74*d* may be located in the second extension space 84*b*. Further, a first portion of the rib 74*e* may be located in the first extension space 84*a*, and a second portion of the rib 74*e* may be located in the second extension space 84*b*. Further, the posture of the rib 74*d* may be the same as the postures of the ribs 74*a* and 74*c*, and the posture of the rib 74*e* may be the same as the posture of the rib 74*b*. In this case, the distance La5 is larger than the distance La6.

As shown in FIG. 8, the partial passage 82*b* at the position of the rib group 80*b* is arranged across the first extension space 84*a* and the second extension space 84*b*. Similarly, the partial passage 82*a* at the position of the rib group 80*b* is arranged across the first extension space 84*a* and the second extension space 84*b*.

Figure 9:
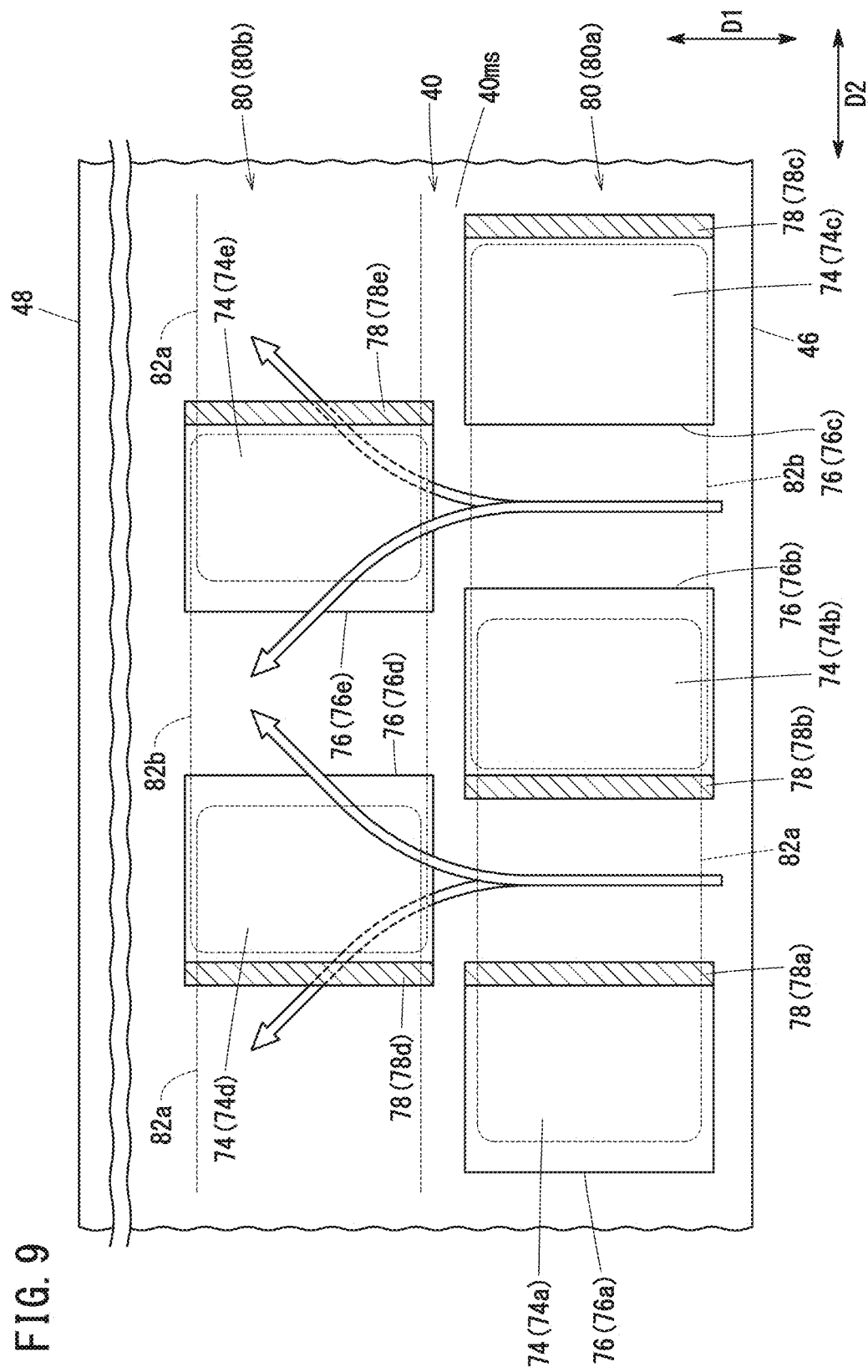
FIG. 9 is a diagram showing the flow of a coolant in the first example.

As shown in FIG. 9, the rib 74*d* divides the coolant flowing through the partial passage 82*a* at the position of the rib group 80*a* into two partial passages 82*a* and 82*b* at the position of the rib group 80*b*. The rib 74*e* divides the coolant flowing through the partial passage 82*b* at the position of the rib group 80*a* into two partial passages 82*a* and 82*b* at the position of the rib group 80*b*.

Specific Example of Numerical Values Regarding Ribs 74

Figure 10:
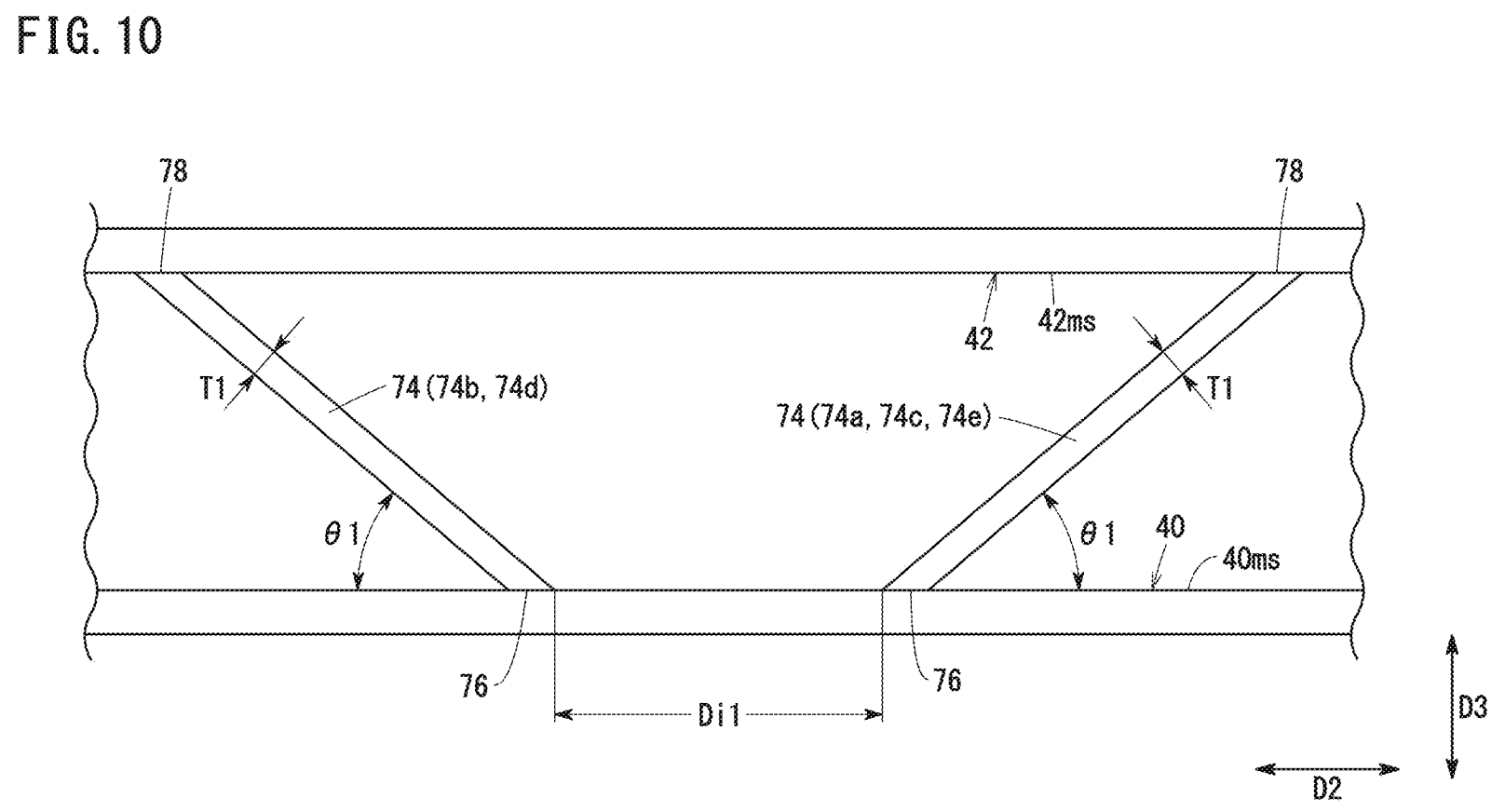

FIG. 10 is an enlarged view of a pair of ribs 74 (the ribs 74*a*, 74*c*, and 74*e* in the first posture, and the ribs 74*b* and 74*d* in the second posture). The ribs 74*a*, 74*c*, and 74*d* in the second posture are different from the ribs 74*b* and 74*d* in the second posture in the direction in which they are inclined with respect to the main surface 40*ms* (the direction in which they protrude from the main surface 40*ms*). On the other hand, an inclination angle θ1 of the ribs 74*a*, 74*c*, and 74*e* with respect to the main surface 40*ms* of the inner peripheral tube portion 40 is the same as an inclination angle θ1 of the ribs 74*b* and 74*d* with respect to the main surface 40*ms* of the inner peripheral tube portion 40. By setting the inclination angle θ1 of the ribs 74 to 3 degrees or more, an appropriate flow velocity difference can be generated between the coolant flowing near the inner peripheral tube portion 40 and the coolant flowing near the outer peripheral tube portion 42 in the partial passages 82*a* and 82*b*. On the other hand, when the inclination angle θ1 of the ribs 74 exceeds 45 degrees, the cooling performance of the cooler 20 is significantly reduced. From the above, it is considered that the inclination angle θ1 of the ribs 74 with respect to the main surface 40*ms* of the inner peripheral tube portion 40 is preferably about 3 to 45 degrees.

From the viewpoint of increasing the surface area of the cooler 20 that can be in contact with the coolant, a thickness T1 of the ribs 74 is preferably thin. As the thickness T1 of the ribs 74 decreases, the number of the ribs 74 that can be formed in the cooler 20 increases. As the number of the ribs 74 increases, the surface area of the cooler 20 that can be in contact with the coolant increases. Therefore, the cooling performance of the cooler 20 is improved. When the thickness T1 of the ribs 74 exceeds 5 mm, the cooling performance of the cooler 20 is significantly reduced. According to the current AM method, the minimum formable thickness is about 0.2 mm. From the above, it is considered that the thickness T1 of the ribs 74 is preferably 0.2 mm or more and 5 mm or less.

From the viewpoint of increasing the surface area of the cooler 20 that can be in contact with the coolant, a separation distance Di1 between a pair of adjacent ribs 74 is preferably small. The separation distance Di1 is the smaller of the distances between the base ends 76 and between the protruding ends 78 of the pair of ribs 74. According to the current AM method, the minimum formable clearance is about 0.1 mm. Therefore, the lower limit of the separation distance Di1 between the pair of adjacent ribs 74 is about 0.1 mm.

Advantageous Effects Obtained by Cooler 20 of First Example

According to the first example, a flow velocity difference can be generated in the coolant in one passage (the partial passage 82*a*, 82*b*) sandwiched between a pair of ribs 74 adjacent to each other in the second direction (D2). Specifically, in one partial passage 82*a*, 82*b*, the flow velocity of the coolant can be changed for each position in the third direction (D3). In addition, in one rib group 80, the flow velocity of the coolant can be changed also between the partial passage 82*a* and the partial passage 82*b* adjacent to each other. By generating a flow velocity difference in the coolant flowing in the same direction, turbulence of the coolant is likely to be generated. When the turbulence is generated, the coolant is stirred. Then, unevenness of the temperature of the coolant in the coolant passage 44 is reduced. As a result, the cooling performance of the cooler 20 is improved. That is, according to the first example, it is possible to provide the suitable cooler 20.

According to the first example, the partial passage 82*a* and the partial passage 82*b* are alternately arranged in the second direction (D2). This complicates the flow of the coolant, and the turbulence of the coolant is more likely to occur. Therefore, the coolant is stirred, and the unevenness of the temperature of the coolant in the coolant passage 44 is reduced.

According to the first example, the coolant flowing through the partial passage 82*a* at the position of the rib group 80*a* is divided into the two partial passages 82*a* and 82*b* by the rib 74*d* at the position of the rib group 80*b*. Similarly, the coolant flowing through the partial passage 82*b* at the position of the rib group 80*a* is divided into the two partial passages 82*a* and 82*b* by the rib 74*e* at the position of the rib group 80*b*. This complicates the flow of the coolant, and the turbulence of the coolant is more likely to occur. Therefore, the coolant is stirred, and the unevenness of the temperature of the coolant in the coolant passage 44 is reduced.

6-2. Cooler 20 of Second Example

Figure 12:
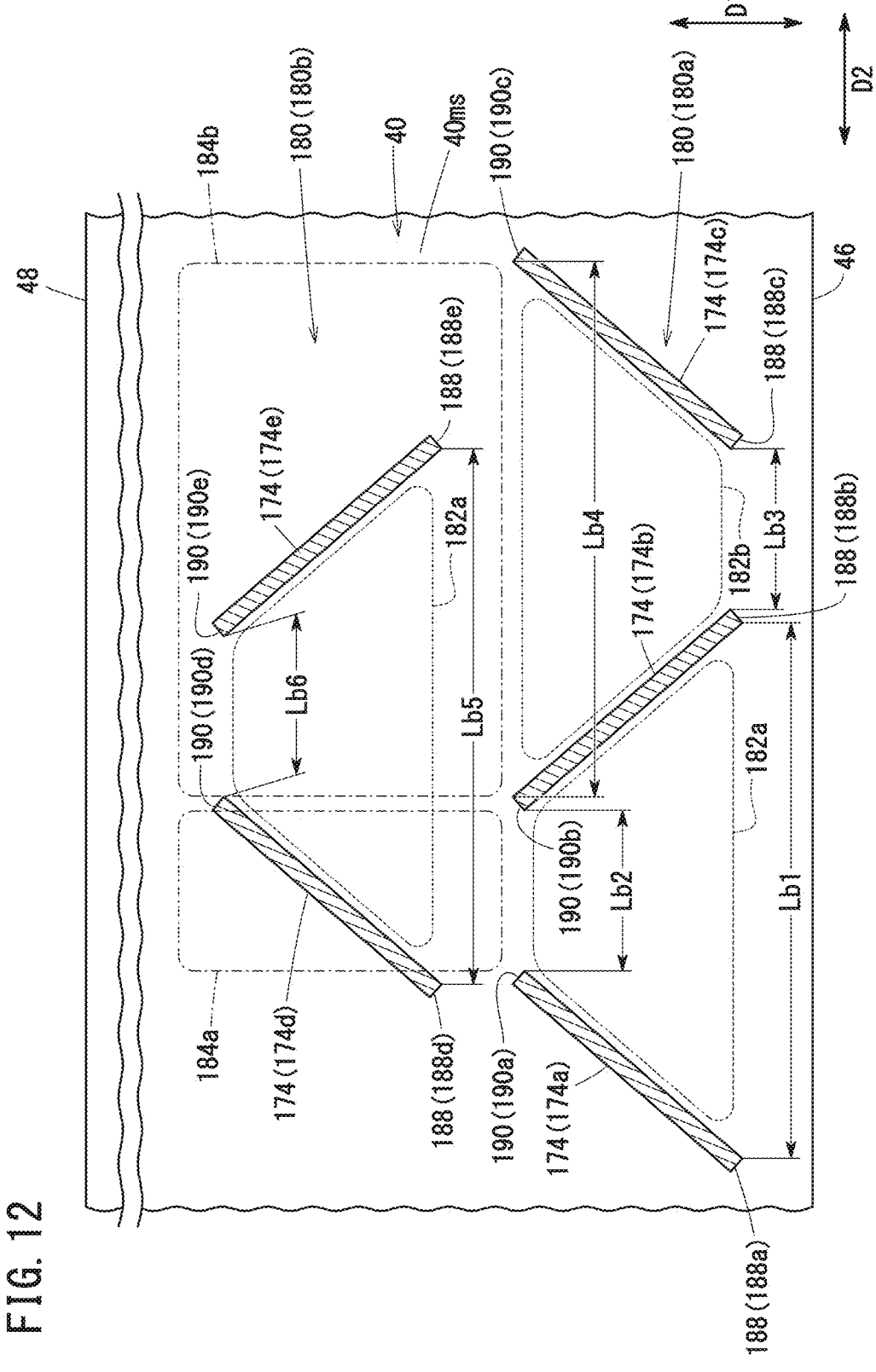
FIG. 12 is a schematic view of the inside of the cooler of the second example.

FIGS. 11 and 12 are schematic views of the inside of the cooler 20 of a second example. The following description will be focused on the difference between the cooler 20 of the second example and the cooler 20 of the first example. The cooler 20 of the first example and the cooler 20 of the second example are different from each other in the posture of ribs 174.

A portion of each rib 174 that is disposed closer to the inflow end 46 of the coolant passage 44 is referred to as an upstream side end portion 188. A portion of each rib 174 that is disposed closer to the outflow end 48 of the coolant passage 44 is referred to as a downstream side end portion 190.

(Rib Group 180*a*)

As shown in FIG. 11, in one rib group 180, the ribs 174 in a third posture and the ribs 174 in a fourth posture are alternately arranged in the second direction (D2). In this instance, for the sake of simplicity of description, the arrangement and the posture of the plurality of ribs 174 included in one rib group 180 will be described by taking three ribs 174 included in the rib group 180*a* as an example. The three ribs 174 illustrated in the example are referred to as a rib 174*a* (first rib), a rib 174*b* (second rib), and a rib 174*c* (third rib). The rib 174*b* is located between the rib 174*a* and the rib 174*c*. Further, the rib 174*b* is adjacent to the rib 174*a* and adjacent to the rib 174*c*. The ribs 174*a* and 174*c* are the ribs 174 in the third posture. The rib 174*b* is the rib 174 in the fourth posture.

As shown in FIG. 12, a partial passage 182*a* (first partial passage), which is a part of the coolant passage 44, is defined by the rib 174*a*, the rib 174*b*, the inner peripheral tube portion 40 (FIG. 2 or the like), and the outer peripheral tube portion 42 (FIG. 2 or the like). A distance Lb1 between an upstream side end portion 188*a* of the rib 174*a* and an upstream side end portion 188*b* of the rib 174*b* in the second direction (D2) is larger than a distance Lb2 between a downstream side end portion 190*a* of the rib 174*a* and a downstream side end portion 190*b* of the rib 174*b* in the second direction (D2). The width of the partial passage 182*a* decreases as it is away from the inflow end 46. Therefore, in the partial passage 182*a*, a difference is generated between the flow velocity of the coolant flowing near the inflow end 46 and the flow velocity of the coolant flowing near the outflow end 48.

As shown in FIG. 12, a partial passage 182*b* (second partial passage), which is a part of the coolant passage 44, is defined by the rib 174*b*, the rib 174*c*, the inner peripheral tube portion 40, and the outer peripheral tube portion 42. A distance Lb3 between the upstream side end portion 188*b* of the rib 174*b* and an upstream side end portion 188*c* of the rib 174*c* in the second direction (D2) is smaller than a distance Lb4 between the downstream side end portion 190*b* of the rib 174*b* and a downstream side end portion 190*c* of the rib 174*c* in the second direction (D2). The width of the partial passage 182*b* increases as it is away from the inflow end 46. Therefore, in the partial passage 182*b*, a difference is generated between the flow velocity of the coolant flowing near the inflow end 46 and the flow velocity of the coolant flowing near the outflow end 48.

As shown in FIG. 11, at the position of each rib group 180, the partial passage 182*a* wider near the inflow end 46 than near the outflow end 48, and the partial passage 182*b* narrower near the inflow end 46 than near the outflow end 48, are alternately arranged in the second direction (D2). The rib 174 is interposed between the partial passage 182*a* and the partial passage 182*b* adjacent to each other.

(Rib Group 180*b*)

As shown in FIG. 11, the plurality of ribs 174 included in the rib groups 180 other than the rib group 180*a* are also arranged in the same manner as the plurality of ribs 174 included in the rib group 180*a*. For example, the plurality of ribs 174 included in a rib group 180*b* adjacent to the rib group 180*a* are also arranged in the same manner as the plurality of ribs 174 included in the rib group 180*a*. It should be noted that the partial passages 182*a* and 182*b* at the position of the rib group 180*b* are eccentric with respect to the partial passages 182*a* and 182*b* at the position of the rib group 180*a*. Here, the arrangement and the posture of the plurality of ribs 174 included in the two rib groups 180 will be described by taking three ribs 174 included in the rib group 180*a* and two ribs 174 included in the rib group 180*b* as an example. The two ribs 174 included in the rib group 180*b* are referred to as a rib 174*d* (fourth rib) and a rib 174*e* (fifth rib). The rib 174*d* is adjacent to the rib 174*e*. The rib 174*d* is the rib 174 in the third posture. The rib 174*e* is the rib 174 in the fourth posture.

As shown in FIG. 12, a space obtained by virtually extending the partial passage 182*a* toward the downstream of the coolant is referred to as a first extension space 184*a*. A space obtained by virtually extending the partial passage 182*b* toward the downstream of the coolant is referred to as a second extension space 184*b*. At least a portion of the rib 174*d* is located in the first extension space 184*a*. At least a portion of the rib 174*e* is located in the second extension space 184*b*. A distance Lb5 between an upstream side end portion 188*d* of the rib 174*d* and an upstream side end portion 188*e* of the rib 174*e* in the second direction (D2) is different from a distance Lb6 between a downstream side end portion 190*d* of the rib 174*d* and a downstream side end portion 190*e* of the rib 174*e* in the second direction (D2).

It should be noted that at least a portion of the rib 174*d* may be located in the second extension space 184*b*. Further, at least a portion of the rib 174*e* may be located in the first extension space 184*a*.

As shown in FIG. 12, the partial passage 182*a* at the position of the rib group 180*b* is arranged across the first extension space 184*a* and the second extension space 184*b*. Similarly, the partial passage 182*b* at the position of the rib group 180*b* is arranged across the first extension space 184*a* and the second extension space 184*b*.

As shown in FIG. 13, the rib 174*d* divides the coolant flowing through the partial passage 182*a* at the position of the rib group 180*a* into two partial passages 182*a* and 182*b* at the position of the rib group 180*b*. The rib 174*e* divides the coolant flowing through the partial passage 182*b* at the position of the rib group 180*a* into two partial passages 182*a* and 182*b* at the position of the rib group 180*b*.

Specific Example of Numerical Values Regarding Ribs 174

Figure 14:
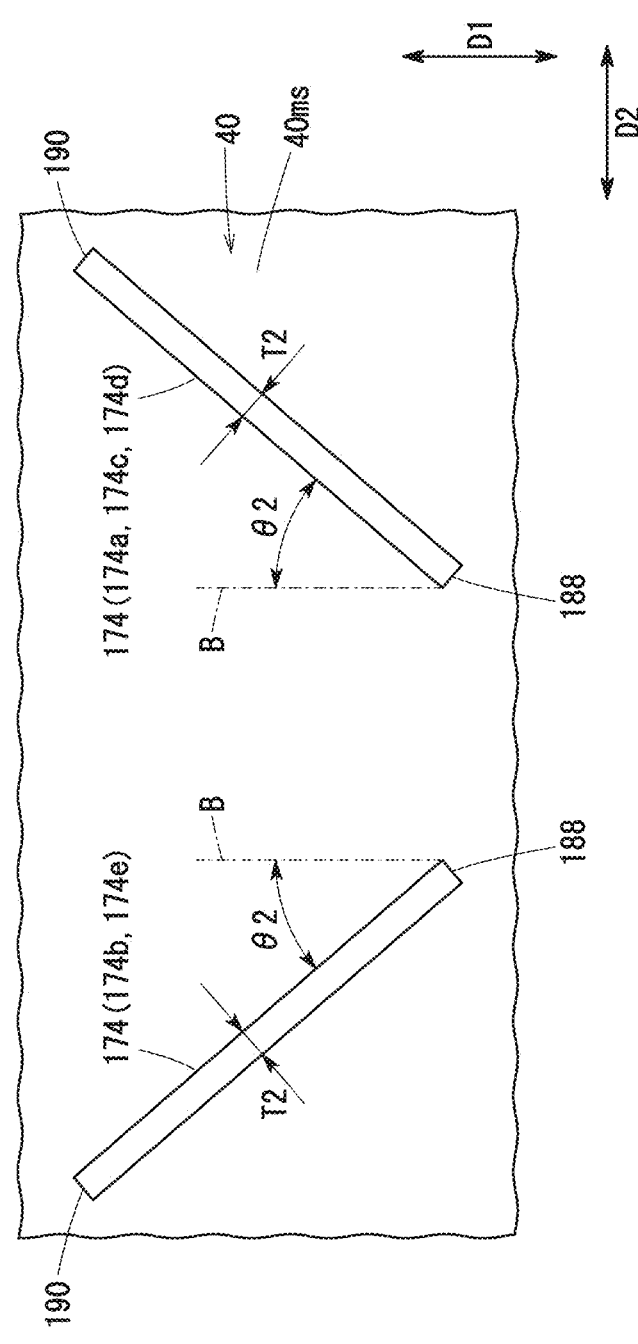
FIG. 14 is an enlarged view of a pair of ribs (a rib in a third posture and a rib in a fourth posture).

FIG. 14 is an enlarged view of the pair of ribs 174 (the ribs 174*a*, 174*c*, and 174*d* in the third posture, and the ribs 174*b* and 174*e* in the fourth posture). The ribs 174*a*, 174*c*, and 174*d* in the third posture are different from the ribs 174*b* and 174*e* in the fourth posture in the direction in which they extend from the inflow end 46 toward the outflow end 48. On the other hand, an inclination angle θ2 of the ribs 174*a*, 174*c*, and 174*d* with respect to an imaginary line B that is parallel to the axis A is the same as an inclination angle θ2 of the ribs 174*b* and 174*e* with respect to the imaginary line B. That is, the inclination angles θ2 of the ribs 174*a* to 174*e* with respect to the first direction (D1) are the same. By setting the inclination angle θ2 of the ribs 174 to 3 degrees or more, an appropriate flow velocity difference can be generated between the coolant flowing near the inflow end 46 and the coolant flowing near the outflow end 48 in the partial passages 182a and 182b. Furthermore, the flow velocity of the coolant can be made moderate. On the other hand, when the inclination angle θ2 of the ribs 174 exceeds 45 degrees, separation of the coolant from the ribs 174 occurs, and the cooling performance of the cooler 20 is reduced. From the above, it is considered that the inclination angle θ2 of the ribs 174 with respect to the first direction (D1) is preferably about 3 to 45 degrees.

From the viewpoint of increasing the surface area of the cooler 20 that can be in contact with the coolant, a thickness T2 of the ribs 174 is preferably thin. As the thickness T2 of the ribs 174 decreases, the number of the ribs 174 that can be formed in the cooler 20 increases. As the number of the ribs 174 increases, the surface area of the cooler 20 that can be in contact with the coolant increases. Therefore, the cooling performance of the cooler 20 is improved. When the thickness T2 of the ribs 174 exceeds 5 mm, the cooling performance of the cooler 20 is significantly reduced. According to the current AM method, the minimum formable thickness is about 0.2 mm. From the above, it is considered that the thickness T2 of the ribs 174 is preferably 0.2 mm or more and 5 mm or less.

Advantageous Effects Obtained by Cooler 20 of Second Example

According to the second example, a flow velocity difference can be generated in the coolant in one passage (the partial passage 182a, 182b) sandwiched between a pair of ribs 174 adjacent to each other in the second direction (D2). Specifically, in one partial passage 182a, 182b, the flow velocity of the coolant can be changed for each position in the first direction (D1). In addition, in one rib group 180, the flow velocity of the coolant can be changed also between the partial passage 182a and the partial passage 182b adjacent to each other. By generating a flow velocity difference in the coolant flowing in the same direction, turbulence of the coolant is likely to be generated. When the turbulence is generated, the coolant is stirred. Then, unevenness of the temperature of the coolant in the coolant passage 44 is reduced. As a result, the cooling performance of the cooler 20 is improved. That is, according to the second example, it is possible to provide the suitable cooler 20.

According to the second example, the partial passage 182a and the partial passage 182b are alternately arranged in the second direction (D2). This complicates the flow of the coolant, and the turbulence of the coolant is more likely to occur. Therefore, the coolant is stirred, and the unevenness of the temperature of the coolant in the coolant passage 44 is reduced.

According to the second example, the coolant flowing through the partial passage 182a at the position of the rib group 180a is divided into the two partial passages 182a and 182b by the rib 174d at the position of the rib group 180b. Similarly, the coolant flowing through the partial passage 182b at the position of the rib group 180a is divided into the two partial passages 182a and 182b by the rib 174e at the position of the rib group 180b. This complicates the flow of the coolant, and the turbulence of the coolant is more likely to occur. Therefore, the coolant is stirred, and the unevenness of the temperature of the coolant in the coolant passage 44 is reduced.

According to the second example, each rib 174 is inclined with respect to the imaginary line B that is parallel to the axis A of the housing 12. Consequently, each rib 174 functions as an obstacle to the coolant. Then, the flow of the coolant becomes complicated, and the coolant flows at a moderate flow velocity inside the coolant passage 44. Therefore, the amount of heat absorbed by the coolant can be improved.

7. Modification

The cooler 20 of the first example and the cooler 20 of the second example include the inner peripheral tube portion 40, the outer peripheral tube portion 42, and the plurality of ribs 74, 174. However, the cooler 20 may not include the outer peripheral tube portion 42. In this case, the coolant flows between the inner peripheral tube portion 40 and the inner peripheral surface 49is of the large-diameter tube portion 49. The gap G is formed between the inner peripheral surface 49is of the large-diameter tube portion 49 of the outer tube component 22, and the protruding end 78 of each rib 74 or the protruding end (no reference numeral) of each rib 174.

The cooler 20 of the first example and the cooler 20 of the second example may be combined. Specifically, the ribs 74 and 174 provided in the cooler 20 may be inclined with respect to the main surface 40ms of the inner peripheral tube portion 40 and inclined with respect to the imaginary line B that is parallel to the axis A.

In the description of the first example and the description of the second example, the rectangular flat plate shaped ribs 74 and 174 are illustrated. However, the shapes of the ribs 74 and 174 are not limited thereto. For example, the ribs 74 and 174 may be curved in either direction. Further, the ribs 74 and 174 may also be corrugated. In addition, the thickness of the ribs 74 and 174 near the inner peripheral tube portion 40 may be different from the thickness of the ribs 74 and 174 near the outer peripheral tube portion 42. Further, the thickness of the ribs 74 and 174 near the inflow end 46 may be different from the thickness of the ribs 74 and 174 near the outflow end 48.

8. Supplementary Notes

The following supplementary notes are further disclosed in relation to the above-described disclosure.

Supplementary Note 1

The cooler (20) of the present disclosure includes the base material (40), and the plurality of ribs (174) protruding from the main surface (40ms) of the base material, wherein the first end portion (20a) of the base material is located at the inflow end (46) into which the coolant flows, the second end portion (20b) of the base material is located at the outflow end (48) from which the coolant flows out, the plurality of ribs include the first rib group (180a) including a plurality of the ribs arranged in the second direction (D2) that intersects the first direction (D1) which is a direction from the first end portion of the base material toward the second end portion of the base material, the first rib group includes the first rib (174a) among the plurality of ribs, the second rib (174b) among the plurality of ribs, and the third rib (174c) among the plurality of ribs, the second rib is located between the first rib and the third rib, the distance (Lb1) between the upstream side end portion (188a) of the first rib and the upstream side end portion (188b) of the second rib in the second direction is larger than the distance (Lb2) between the downstream side end portion (190a) of the first rib and the downstream side end portion (190b) of the second rib in the second direction, and the distance (Lb3) between the upstream side end portion of the second rib and the upstream side end portion (188c) of the third rib in the second direction is smaller than the distance (Lb4) between the downstream side end portion of the second rib and the downstream side end portion (190c) of the third rib in the second direction.

According to the above configuration, a flow velocity difference can be generated in the coolant in one passage sandwiched between a pair of ribs adjacent to each other in the second direction. By generating a flow velocity difference in the coolant flowing in the same direction, turbulence of the coolant is likely to be generated. When the turbulence is generated, the coolant is stirred. Then, unevenness of the temperature of the coolant in the coolant passage is reduced. As a result, the cooling performance of the cooler is improved. That is, according to the above configuration, it is possible to provide a suitable cooler.

Supplementary Note 2

In the cooler according to supplementary note 1, the plurality of ribs may further include the second rib group (180b) located in the first direction with respect to the first rib group, the second rib group may include the fourth rib (174d) among the plurality of ribs and the fifth rib (174e) among the plurality of ribs, at least a portion of the fourth rib may be located in the first extension space (184a) obtained by virtually extending the first partial passage (182a) defined by the first rib and the second rib, at least a portion of the fifth rib may be located in the second extension space (184b) obtained by virtually extending the second partial passage (182b) defined by the second rib and the third rib, and the distance (Lb5) between the upstream side end portion (188d) of the fourth rib and the upstream side end portion (188e) of the fifth rib in the second direction may be different from the distance (Lb6) between the downstream side end portion (190d) of the fourth rib and the downstream side end portion (190e) of the fifth rib in the second direction.

According to the above configuration, the coolant flowing through the partial passage at the position of the first rib group is divided into two partial passages by the fourth rib at the position of the second rib group. Similarly, the coolant flowing through the partial passage at the position of the first rib group is divided into two partial passages by the fifth rib at the position of the second rib group. This complicates the flow of the coolant, and the turbulence of the coolant is more likely to occur. Therefore, the coolant is stirred, and the unevenness of the temperature of the coolant in the coolant passage is reduced.

Supplementary Note 3

In the cooler according to supplementary note 1 or 2, each of the ribs may be inclined at 3 to 45 degrees with respect to the first direction.

According to the above configuration, it is possible to suppress a decrease in cooling performance of the cooler.

Supplementary Note 4

The housing (12) of the present disclosure includes the cooler according to any one of supplementary notes 1 to 3.

Supplementary Note 5

The rotating electric machine (10) of the present disclosure includes the housing according to supplementary note 4.

The present invention is not limited to the above disclosure, and various modifications are possible without departing from the essence and gist of the present invention.

The invention claimed is:

1. A cooler comprising:
a base material; and
a plurality of ribs protruding from a main surface of the base material,
wherein a first end portion of the base material is located at an inflow end into which a coolant flows,
a second end portion of the base material is located at an outflow end from which the coolant flows out,
the plurality of ribs include a first rib group including a plurality of the ribs arranged in a second direction that intersects a first direction which is a direction from the first end portion of the base material toward the second end portion of the base material,
the first rib group includes a first rib among the plurality of ribs, a second rib among the plurality of ribs, and a third rib among the plurality of ribs,
the second rib is located between the first rib and the third rib,
a distance between an upstream side end portion of the first rib and an upstream side end portion of the second rib in the second direction is larger than a distance between a downstream side end portion of the first rib and a downstream side end portion of the second rib in the second direction, and
a distance between the upstream side end portion of the second rib and an upstream side end portion of the third rib in the second direction is smaller than a distance between the downstream side end portion of the second rib and a downstream side end portion of the third rib in the second direction.

2. The cooler according to claim 1, wherein
the plurality of ribs further include a second rib group located in the first direction with respect to the first rib group,
the second rib group includes a fourth rib among the plurality of ribs, and a fifth rib among the plurality of ribs,
at least a portion of the fourth rib is located in a first extension space obtained by virtually extending a first partial passage defined by the first rib and the second rib,
at least a portion of the fifth rib is located in a second extension space obtained by virtually extending a second partial passage defined by the second rib and the third rib, and
a distance between an upstream side end portion of the fourth rib and an upstream side end portion of the fifth rib in the second direction is different from a distance between a downstream side end portion of the fourth rib and a downstream side end portion of the fifth rib in the second direction.

3. The cooler according to claim 1, wherein
each of the ribs is inclined at 3 to 45 degrees with respect to the first direction.

4. A housing comprising the cooler according to claim 1.

5. A rotating electric machine comprising the housing according to claim 4.

* * * * *